(12) United States Patent
Cirkel et al.

(10) Patent No.: US 7,394,506 B2
(45) Date of Patent: Jul. 1, 2008

(54) REFLECTIVE STEREOSCOPIC DISPLAY WITH FIRST AND SECOND LIQUID CRYSTAL CELLS

(75) Inventors: Peter Albert Cirkel, Eindhoven (NL); Gerardus Petrus Karman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 199 days.

(21) Appl. No.: 10/520,339

(22) PCT Filed: Jun. 18, 2003

(86) PCT No.: PCT/IB03/02405

§ 371 (c)(1),
(2), (4) Date: Jan. 4, 2005

(87) PCT Pub. No.: WO2004/006005

PCT Pub. Date: Jan. 15, 2004

(65) Prior Publication Data

US 2005/0254113 A1 Nov. 17, 2005

(30) Foreign Application Priority Data

Jul. 8, 2002 (EP) .................................. 02077731

(51) Int. Cl.
*G02F 1/1335* (2006.01)
(52) U.S. Cl. .............................. 349/15; 349/74; 349/77; 349/83; 349/115; 345/6

(58) Field of Classification Search ................... 349/15, 349/115, 73, 74, 175, 176
See application file for complete search history.

(56) References Cited

U.S. PATENT DOCUMENTS 5,537,144 A * 7/1996 Faris ............................ 348/58

(Continued)

OTHER PUBLICATIONS

Kawata Y et al "A High Reflective LCD With Double Chlesteric Liquid Crystal Layers" Conference Record of the 1997 International Display Research Conference and International Workshops on LCD Technology and Emissive Technology. Toronto, Sep. 15-19, 1997, Santa Ana, CA, vol. Conf. 17.

(Continued)

*Primary Examiner*—Andrew Schechter
*Assistant Examiner*—Nathanael R Briggs (57) ABSTRACT

An apparatus comprising a first cell (10*b*), said first cell comprising a plurality of first elements (34*b*), said first elements being controllable between a non-reflective state, in which electromagnetic radiation having a first polarization is reflected to a first extent, and a reflective state, in which said electromagnetic radiation having a first polarization is reflected to a second extent, said second extent being greater than said first extent. Said apparatus further comprises a second cell (10*a*), superimposed on the first cell, said second cell comprising a plurality of second elements (34*a*), said second elements being controllable between a non-reflective state, in which electromagnetic radiation having a second polarization is reflected to a third extent, and a reflective state, in which said electromagnetic radiation having a second polarization is reflected to a fourth extent, said fourth extent being greater than said third extent. Said first and second elements are arranged so that said first polarization is different from said second polarization.

12 Claims, 9 Drawing Sheets

U.S. PATENT DOCUMENTS

| | | |
|---|---|---|
| 6,392,725 B1 * | 5/2002 | Harada et al. .................. 349/74 |
| 6,580,482 B1 * | 6/2003 | Hiji et al. .................... 349/115 |
| 6,906,762 B1 * | 6/2005 | Witehira et al. ............... 349/73 |
| 2002/0085151 A1 * | 7/2002 | Faris et al. .................. 349/117 |
| 2002/0176041 A1 * | 11/2002 | Hisamitsu et al. ........... 349/115 |
| 2003/0206260 A1 * | 11/2003 | Kobayashi et al. .......... 349/115 |

OTHER PUBLICATIONS

Patent Abstracts of Japan vol. 2000, No. 14, Mar. 5, 2001.

* cited by examiner

REFLECTIVE STEREOSCOPIC DISPLAY WITH FIRST AND SECOND LIQUID CRYSTAL CELLS

The present invention relates to an apparatus comprising a first cell, said first cell comprising a plurality of first elements, said first elements being controllable between a non-reflective state, in which electromagnetic radiation having a first polarization is reflected to a first extent, and a reflective state, in which said electromagnetic radiation having a first polarization is reflected to a second extent, said second extent being greater than said first extent; and a second cell, superimposed on the first cell, said second cell comprising a plurality of second elements, said second elements being controllable between a non-reflective state, in which electromagnetic radiation having a second polarization is reflected to a third extent, and a reflective state, in which said electromagnetic radiation having a second polarization is reflected to a fourth extent, said fourth extent being greater than said third extent.

The present invention also relates to a reflective display comprising an apparatus of the aforementioned type and to a portable device comprising such a reflective display.

The present invention also relates to a method of providing varying brightness in an apparatus of the aforementioned type.

The present invention finally relates to a method of providing two images in a reflective display comprising an apparatus of the aforementioned type.

Evolution has provided many living creatures on our planet with two eyes, which are spatially separated from each other within the head, thus having two separate, but not necessarily different, fields of vision. Natural selection has evidently proved that it is very beneficial if these two separate fields of vision are arranged to largely overlap each other, thus providing two slightly different perspective views of the observed surroundings to the brain, which is capable of combining the provided information and using it in estimating the distance to an observed object. The capability of determining distances and differences in distances using two eyes is often referred to as stereoscopic vision.

Prior art comprises several so called stereoscopic display devices, which accordingly endeavor to provide users with the sensation of a more realistic perception of different kinds of presented images such as 3D-movies (more formally known as stereoscopic movies). Stereoscopic vision enhances a user's experienced degree of realism in comparison with standard, non-stereoscopic display devices, and would be an advantage in various applications of entertainment, such as movies, games etc., and education, such as flight simulators. Stereoscopic vision would also be an advantage in various other applications, for instance, in so-called telemedicine wherein a remote medical expert's stereoscopic perception of a studied object such as a human organ would be an outstanding aid, both in various diagnostic applications and treatment applications.

The fundamental approach to providing a user with a sensation of stereoscopic vision, i.e. the sensation of "depth" in an image, consists of providing two different images, one for each of the two eyes of an observer, said two different images corresponding to two perspective views, which preferably correspond to the perspective views the observer would normally acquire, should he or she study the depicted object from a certain distance using both eyes.

A display apparatus is often designed and arranged in such a way that the two eyes of an observer are able to see both images, which is why the current approach to providing the experience of stereoscopic vision necessitates the provision of eyewear to an observer, wherein the eyewear comprises means which somehow select the image which is intended for each eye, so that the appropriate perspective view is presented to each eye. Another way of describing the current approach is to state that a single display apparatus presents two separate perspective views which are encoded, and that the user is provided with eyewear which decodes the perspective views so that each eye only receives one intended perspective view.

Prior art comprises apparatuses which are based on the encoding of the perspective views in two colors, for instance red and green, respectively, and the provision of eyewear comprising red and green filters, a solution which has the disadvantage of not being able to provide a stereoscopic experience in color.

Prior art furthermore comprises the alternating provision of two perspective views and eyewear comprising alternating shutters; an approach which requires an observer to use bulky, expensive equipment with fragile mechanics which will eventually break or that have an overwhelming weight which renders the usage of such equipment impossible during longer periods, and in addition requires computer power and fine-tuned clocks, especially when the two shutters of two observers would simultaneously observe the same two sequentially projected images.

Finally, prior art further comprises the alternating provision of two perspective views, which are encoded using polarization, i.e. the light of the two perspective views have a different polarization, and the provision of decoding eyewear comprising polarizing means.

A great disadvantage with all prior-art stereoscopic apparatuses is that they are only transmissive, which is sometimes an inherent consequence of the polarization process, wherein the total transmitted intensity is normally reduced.

A stereoscopic display device has been described in European patent application EP 0349692, "Stereoscopic display", herein incorporated by reference. Said application describes a stereoscopic display which is capable of displaying monochromatic or colored views of moving, three-dimensional scenes, and which comprises means for sequentially projecting alternate ones of successive pairs of substantially monochromatic images corresponding to right-eye and left-eye perspectives of the scene at a display rate which is sufficient to avoid flicker in the images. A variable polarizer is used to circularly polarize alternate images in respective opposite senses synchronously at their projection rate. The images are analyzed by highly transmissive eyewear comprising at least one pair of oppositely sensed cholesteric liquid crystal polarizing means tuned to the particular color wavelength of the images and disposed, one over each eye, to transmit only appropriately polarized images to the corresponding eye.

Said apparatus is associated with several disadvantages, which render it inappropriate in several important applications, where stereoscopic vision would be an advantage. As with other prior-art stereoscopic apparatuses, said apparatus is a transmissive display and thus requires a backlight unit.

Furthermore, the apparatus comprises means for providing sequential projection of images, such means being often noisy and subjected to mechanical strain during operation. Ultimately, these features result in increased power consumption, mass and volume, which implies that an implementation of such a stereoscopic display in a portable apparatus would be associated with many disadvantages.

The pictures from said apparatus are furthermore projected sequentially, which involves a regrettable quality reduction, because normal vision implies the continuous provision of images, i.e. the two eyes receive simultaneous images of the observed environment.

It is another problem that the images are projected sequentially, even when this is not necessary, as in the case where an identical image, such as a typical 2D-image, is projected, which is a disadvantage because unnecessar power consumption and bulky technology is used.

It is thus a great disadvantage that the prior-art apparatuses are not suitable for the alternating or even simultaneous provision of 2D and 3D images, respectively.

Furthermore, the underlying technology deprives the user of a possibility of adjusting the brightness, and since he or she is already wearing the compulsory eyewear, brightness reduction cannot be obtained by conventional methods, for instance by using sunglasses.

Furthermore, the apparatus is not suitable in cases where there are three intended receivers of three separate images, but is merely restricted to provision of the same stereoscopic experience, no matter how many observers there are.

In the prior art, liquid crystal displays have proved to be suitable for various applications which necessitate compactness and a low power consumption. A liquid crystal display (LCD) is a flat panel display device having advantages of small bulk, thin thickness and low power consumption.

LCDs have been used in connection with portable devices such as mobile telephones, portable computers, electronic calendars, electronic books, televisions or video game controls and various other office automation equipment and audio/video machinery, etc.

LCDs control an electric field which is applied to a liquid crystal material having a dielectric anisotropy to transmit or shut off light, thereby displaying a picture or an image, all in a fashion known per se as is recognized by those skilled in the art and as will be briefly explained. Unlike display devices that generate light internally—such as electroluminiscence (EL) devices, cathode ray tubes (CRT) and light-emitting diodes (LED)—LCDs use an external light source.

LCD devices are largely classified into transmissive type devices and reflective type devices, depending on the method of utilizing light. Apart from a liquid crystal panel having a liquid crystal mixture injected between two transparent substrates, the transmissive type LCD includes a backlight unit for supplying light to the liquid crystal panel. It is, however, very difficult to make a transmissive LCD with a thin thickness and a low weight. Moreover, the backlight units of transmissive LCDs have an excessive power consumption.

In contrast, reflective type LCDs include a reflective liquid crystal display panel that transmits and reflects natural light and peripheral light to and from the display screen without a backlight unit.

Reflective type LCDs are not suitable for any of the prior-art stereoscopic apparatuses, because all of them necessitate a transmissive display, inter alia, because of the reduction in the intensity of light which is inherent in the polarization process.

A basic liquid crystal display can easily be constructed by coating two separate thin sheets of a transparent material, such as glass or plastics, with a transparent metal oxide. Preferably, the metal oxide is applied in the shape of parallel lines on each of the separate sheets, and constitutes the row and column conductors of the LCD. When the two sheets are superimposed with the row conductors perpendicular to the column conductors, the rows and columns form a matrix of pixel elements. The row conductors further serve to set up the voltage across a cell, which is necessary for the orientation translation.

An alignment layer, sometimes referred to as orientation layer, is applied to each sheet. The alignment layer may have undergone a rubbing process resulting in a series of microscopic grooves which are parallel and will assist in aligning the contained liquid crystal molecules in a preferred direction, with their longitudinal axes parallel to the grooves, which "anchors" the molecules along the alignment layers and helps the molecules between the alignment layers to twist.

One of the thin sheets is coated with a layer of polymer spacer beads. These beads maintain a uniform gap between the sheets of glass where the liquid crystals are eventually placed. The two glass sheets are then placed together and the edges are sealed with epoxy. A corner is left unsealed so that the liquid crystal material can be injected under a vacuum. Once the display has been filled with liquid crystals, the corner is sealed and polarizers (the transparent layers with lines) are applied to the exposed glass surfaces.

The display is completed by connecting the row and column conductors to the driving circuitry which controls the voltage applied to various areas of the display.

It is an object of the invention to provide a display which is suitable for the alternating display of 2D and 3D images.

Generally speaking, the essence of the invention is that if a display is built using two liquid crystal cells in a new, specific way, the display will have a better performance and several new features. Most importantly, the display may function both as a stereoscopic display and as a standard 2D display. Furthermore, the new display design provides a multitude of other features such as enhanced brightness control, the possible provision of several images to several receivers, and since the construction essentially includes two cells, it enables one of them to partially serve as a back-up unit in case the other cell is damaged or fails. Several embodiments are described including those where the stereoscopic experience does not require a user to use eyewear. For the purpose of illustration, only light at one wavelength is discussed, but a full-color stereoscopic display in a portable device may be a commercial product incorporating the invention.

According to a first aspect, the present invention relates to an apparatus comprising a first cell, said first cell comprising a plurality of first elements, said first elements being controllable between a non-reflective state, in which electromagnetic radiation having a first polarization is reflected to a first extent, and a reflective state, in which said electromagnetic radiation having a first polarization is reflected to a second extent, said second extent being greater than said first extent; and a second cell, superimposed on the first cell, said second cell comprising a plurality of second elements, said second elements being controllable between a non-reflective state, in which electromagnetic radiation having a second polarization is reflected to a third extent, and a reflective state, in which said electromagnetic radiation having a second polarization is reflected to a fourth extent, said fourth extent being greater than said third extent, wherein said first and second elements are arranged so that said first polarization is different from said second polarization.

Preferably, the electromagnetic radiation has a wavelength of between 300 nm and 800 nm (i.e. visible light) and said first polarization and said second polarization are circular polarizations of opposite handedness.

The arrangement can be optionally realized by arranging a polarization-altering element, preferably an appropriate half-wave plate, between said first and second cells which, in this case, are arranged to reflect circularly polarized light of the same handedness. The polarization-altering element could comprise a lens. The first and second cells may optionally be at a distance from the optical element or from each other.

The first and second cells are preferably arranged to transmit a first and a second image to the first and the second eye of an observer. The wavelengths of the light reflected by the respective two cells do not necessarily have to be the same. Preferably, said first and second cells are at least partially made of cholesteric texture liquid crystal (CTLC).

According to a second aspect, the present invention relates to a reflective display comprising an apparatus of the aforementioned type.

According to a third aspect, the present invention relates to a portable device comprising such a reflective display. Such a portable display is preferably, but not necessarily, one of a mobile telephone, a portable computer, an electronic calendar, an electronic book, a television set or a video game control.

According to a fourth aspect, the present invention relates to a method of providing varying brightness in an apparatus of the aforementioned type. This method of providing different levels of brightness can also be applied to apparatuses comprising more than two cells.

According to a fifth aspect, the present invention relates to a method of providing two or more images in a reflective display which comprises an apparatus of the aforementioned type. Preferably, said method can be used to provide different images to the left and right eyes, respectively, said images preferably being perspective views corresponding to the left eye and right eye perspective, respectively, of an observed object or environment. Said method can be preferably used to provide a possibility of switching between 2D and 3D vision using the same apparatus.

These and other aspects, features and advantages of the invention are apparent from and will be elucidated with reference to the embodiments described hereinafter.

The embodiments of the present invention will now be described with reference to FIGS. 1 to 9 of the drawings. Identical elements in the various Figures are denoted by the same reference numerals.

Figure 1:
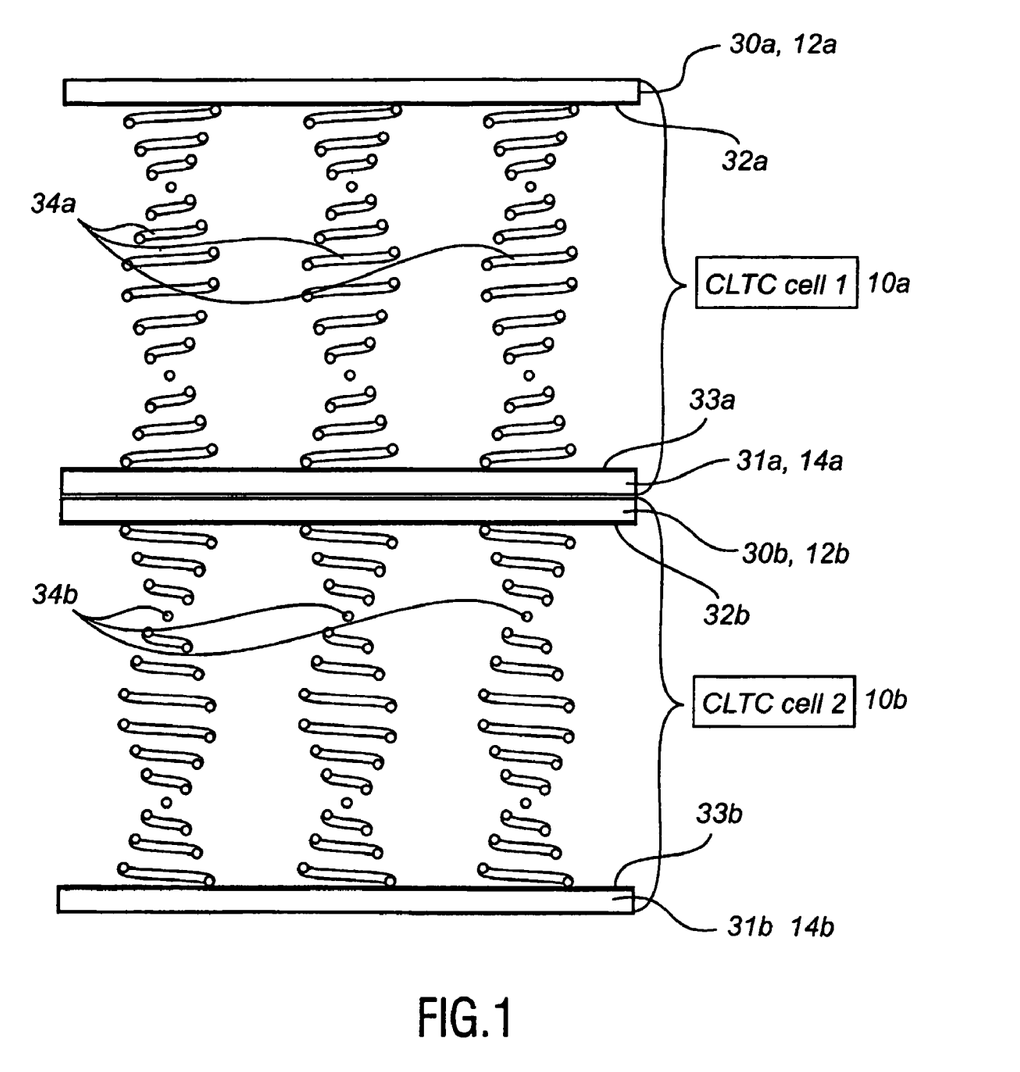
FIG. 1 is a schematic side view of a part of a first, preferred embodiment of a liquid crystal display according to the invention.

FIG. 1 is a schematic side view which illustrates a part of a preferred embodiment of a liquid crystal display according to the invention. For the purpose of illustration; several dimensions such as the size of the molecules and the distances between the sheets of glass have been exaggerated, and the molecular structures of the liquid crystal mixtures have been simplified.

Two cells 10a and 10b, each comprising their own matrix of elements or pixels, are arranged on top of each other. Thin sheets of glass 30a, 31a, 30b, 31b partially enclose each of the two cells as illustrated, from two opposite sides, which sides constitute essentially parallel planes. Plastic substrates can be used instead of glass in order to reduce the parallax between the layers, because plastic substrates can be made thinner than glass.

Each cell 10a, 10b comprises its own set of column conductors 12a, 12b and row conductors 14a, 14b, which are implemented as indium tin oxide (ITO) lines, arranged on said sheets of glass 30a, 31a, 30b, 31b in accordance with prior-art LCDs.

Alignment layers (also known as orientation layers) 32a, 33a, 32b, 33b, each of which may be alignment layer SE7511L from Nissan Chemical Industries, are arranged on the inside of each cell, as indicated in the Figures in order to orient the enclosed liquid crystals 34a, 34b in a preferred way.

Spacer balls (not shown), for instance SP-2050 from Sekisui Chemical, and seal material, e.g. XN21-S from Mitsui Chemical, are preferably used in accordance with prior-art liquid crystal displays to establish a uniform spacing between the thin sheets of glass 30a and 31a, which enclose the upper cell 10a (CTLC cell 1), and the thin sheets of glass 30b and 31b, which enclose the lower cell 10b (CTLC cell 2).

Appropriate liquid crystal mixtures (CTLC materials) 34a, 34b are arranged in the upper and lower cells, respectively. In this case, 34a is a liquid crystal mixture of BL87/BL88 10:90 w:w (Merck) for the upper cell 10a, and 34b is a liquid crystal mixture of BL87/BL95 (Merck) 3:97 w:w (Merck) for the lower cell 10b, so that the two cells comprise liquid crystal mixtures which have opposite twists, i.e. they will reflect circularly polarized light of opposite handedness.

As will be appreciated by those skilled in the art, the CTLC material is a mixture of species. Basically, two species are necessary: a nematic host and a chiral dope. The handedness of the dope determines the handedness of the CTLC, and the concentration of the chiral dope determines the wavelength (color) of the reflected light. In order to make a color display, there are basically two possibilities: make pixels which reflect different colors or stack cells which reflect different colors on top of each other.

It is also possible to change the color of a CTLC-mixture by applying a high electrical field perpendicular to the helical axis, using electrode means, which would be one perceivable manner to realize a full-color, 3D-display using only two layers.

It is perceivable that, in some applications, an isolating layer will be required between the two cells to prevent crosstalk between the row and/or column conductors of the two cells, in particular crosstalk between the row conductor 14a and column conductor 12b. It is also imaginable that the lower substrate 31a of the upper cell 10a and the upper substrate 30b of the lower cell 10b might be implemented as one substrate, possibly comprising a shared column and/or row conductor.

Figure 2:
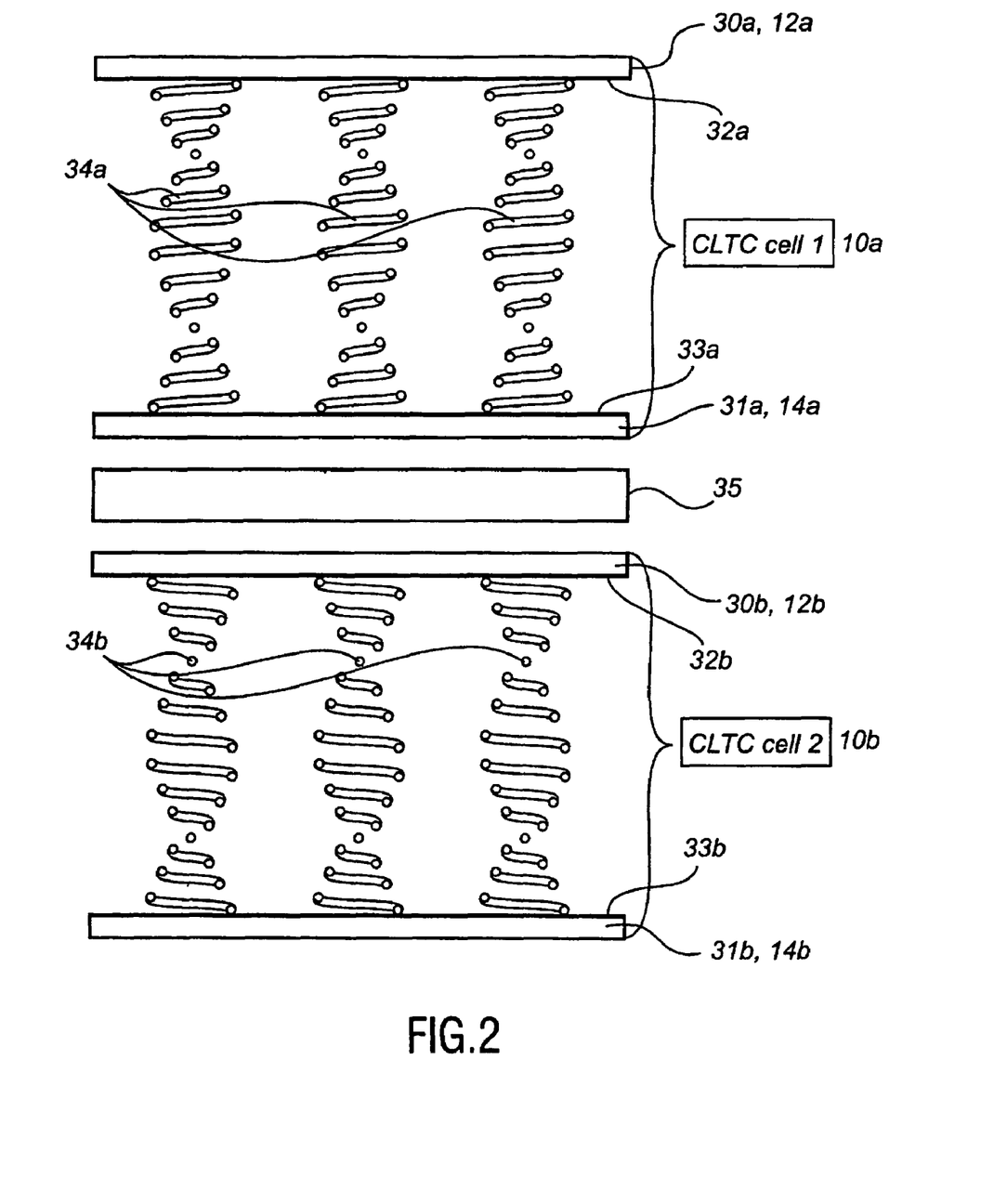
FIG. 2 is a schematic side view of a second embodiment of a liquid crystal display according to the invention.

FIG. 2 is a schematic side view of an alternative embodiment of a liquid crystal display according to the invention, wherein two cells 10a, 10b which comprise CTLC-mixtures 34a, 34b are stacked on top of each other, and wherein an optical element 35 has been introduced between the two cells. For the purpose of simplification, the optical element is illustrated at a distance from the upper and lower cells 10a, 10b.

The optical element 35 may be a polarization-altering element, such as a halfwave plate or another suitable optical component which allows the orientation of circularly polarized light to change, either from left-handed orientation to right-handed orientation, or vice versa.

Such an arrangement would allow both cells 10a, 10b to be filled with the same liquid crystal mixtures, which may be a liquid crystal mixture of BL87/BL88 10:90 w:w (Merck) mentioned before or any other suitable liquid crystal mixture.

In the preferred embodiment, described previously with reference to FIG. 1, the light reflected by each cell would have the same polarization if both cells comprised the same liquid crystal mixture. In the embodiment of FIG. 2, however, the light reflected from one of the cells would pass through the optical element and thus change its polarization, thus resulting in the transmission of two images, one from each cell 10a, 10b, using light of two different polarizations.

Alternatively, the optical element could be a lenticular sheet, as described in U.S. Patents U.S. Pat. No. 6,064,424 or U.S. Pat. No. 6,118,584, which are herein incorporated by reference.

According to one aspect of the invention, the embodiment described above would have the advantage that the light which is reflected from the two cells 10a and 10b would be reflected in slightly different directions. Preferably, these directions are arranged to coincide with the left and right eyes, respectively, of an observer, for instance at a distance of between 0 and 50 cm from the display, should the apparatus be implemented in a small portable apparatus such as a personal digital assistant (PDA) or a portable telephone, etc. Such an embodiment would enable a user to experience stereoscopic vision without eyewear.

According to another aspect of the invention, the embodiment illustrated in FIG. 2 could be implemented as a large-scale display, such as a TV-set for two persons. The angles in which the two cells reflect light could be arranged to coincide with the position of a first and a second observer, sitting at a distance from each other.

One can also imagine the great potential in a display where only a part of the display has the embodiment as described with reference to FIG. 2. For instance, the lowermost part of a screen could be constructed according to the invention, allowing two observers to watch a TV-program and perceive two different subtitles in two different languages, or stock exchange data or news flashes as they are presented on many TV channels, where the lowermost space of the TV screen is allocated for stock exchange data, news updates, etc.

In addition to the lenticular sheet, the optical element could comprise another optical element, for instance a halfwave plate as has been previously discussed with reference to FIG. 2.

Figure 3:
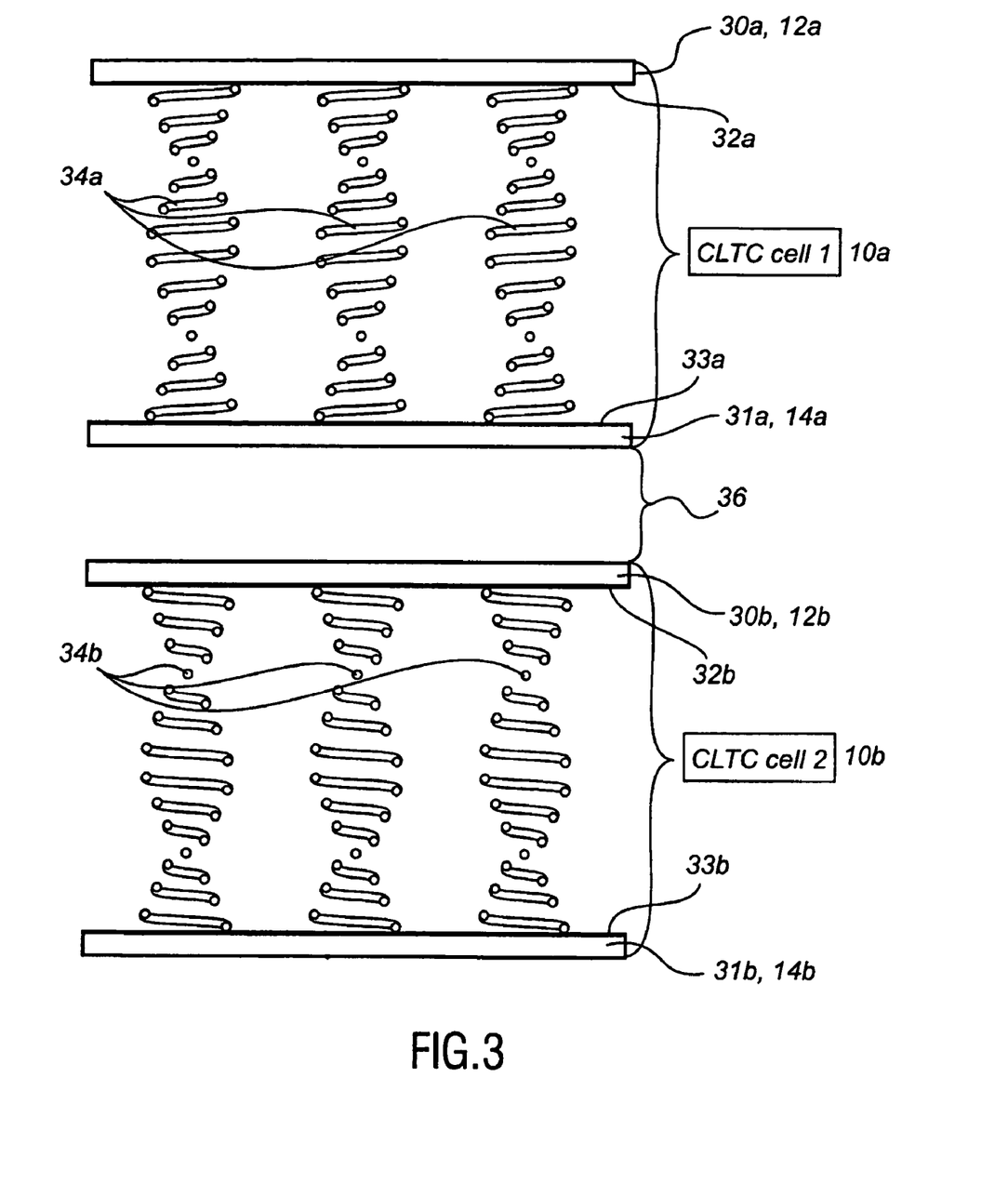
FIG. 3 is a schematic side view of a third embodiment of a liquid crystal display according to the invention.

FIG. 3 is a schematic side view of another alternative embodiment of a liquid crystal display according to the invention, in which in addition to the specification of FIG. 1 the cells are at a certain distance from each other, which implies that light can be reflected from slightly different angles from the first and second cells 10a, 10b, respectively. The fact that the CTLC-mixtures 34a, 34b which are confined in the cells reflect polarized light of opposite handedness (or are arranged to reflect polarized light of opposite handedness by means of the optical element 35 as has been described with reference to FIG. 2), and the fact that the cells are essentially transparent to the light which the other cell reflects, implies that the light emanating from the first and second cells 10a, 10b does not interfere with each other.

Figure 4:
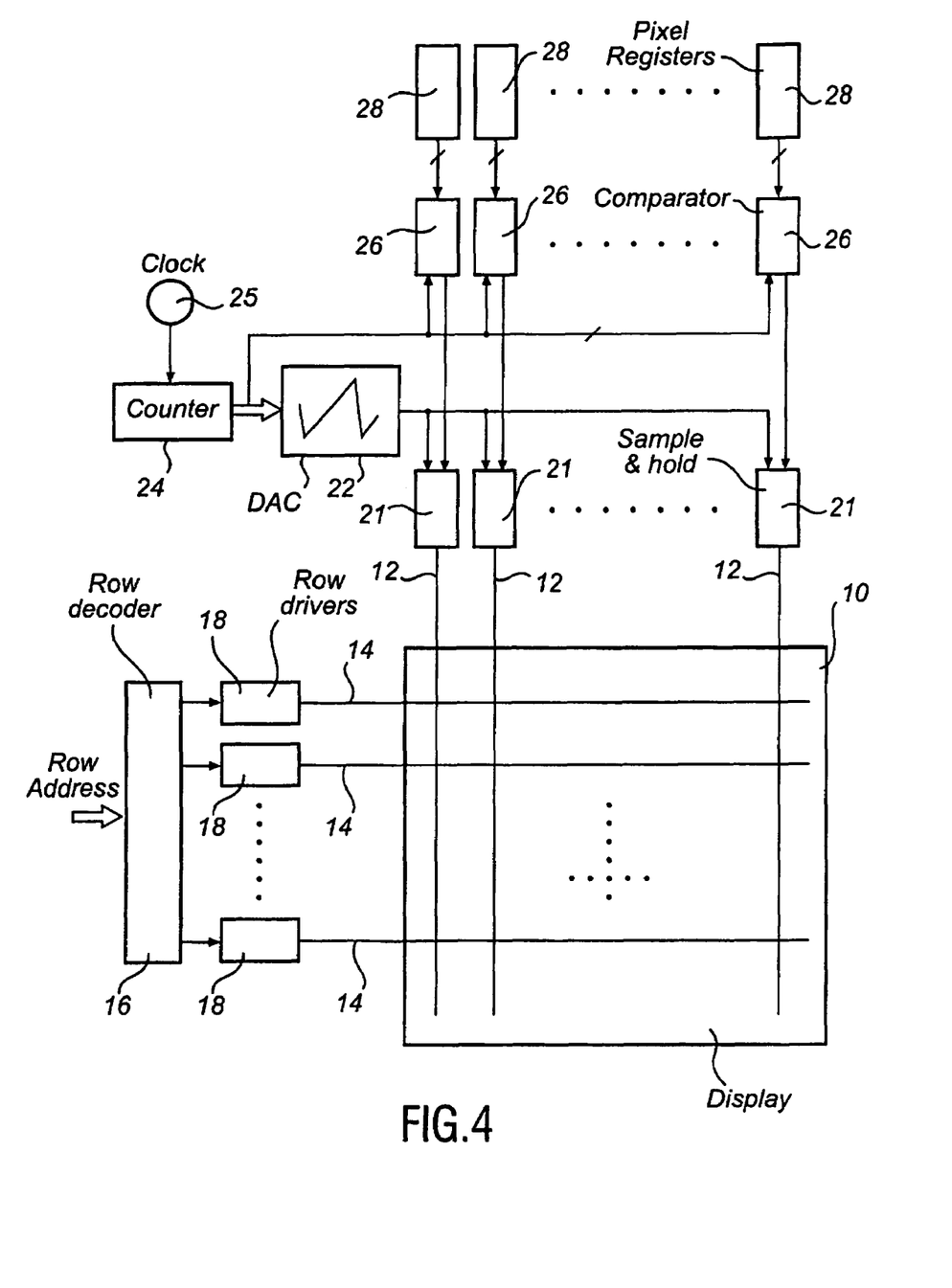
FIG. 4 is a schematic block diagram of a typical prior-art arrangement for controlling and driving an electro-optic display device.

FIG. 4 shows a schematic diagram of a typical prior-art arrangement for controlling and driving an electro-optic display device. In this arrangement, a liquid crystal display 10 has a matrix of pixels arranged vertically in columns and horizontally in rows. These pixels are located at the intersections of the column conductors 12 and the row conductors 14. The column conductors 12 provide analog voltages to the pixels in each column, whereas the row conductors 14 provide a switching voltage to each associated row, permitting the column voltages to be supplied to the pixels of that row.

Rows are successively addressed in a prescribed order by means of a row decoder 16 which activates successive ones of a plurality of row drivers 18.

Column voltages are supplied by column driver circuits which are realized as track-and-hold circuits. These track-and-hold circuits receive a ramp voltage from the output buffer amplifier of a digital-to-analog converter (DAC) 22. The DAC 22 receives successive digital numbers from a counter 24 that counts pulses produced by a clock 25. The count commences either from some minimum number or maximum number and increases or decreases steadily until it reaches, at the opposite end of the scale, a maximum or minimum number, respectively. The DAC thus produces an increasing or decreasing ramp signal, in repetitive cycles, which approximates its digital input.

The output of the counter 24 is also supplied to a number of comparators 26, one for each column. This number is then compared in each comparator with a digital number representing the desired brightness level of a pixel in the associated column. The number representing this brightness level is stored in an associated pixel register 28 during each complete cycle of the system.

When the count supplied by the counter 24 is equal to the digital number stored in a pixel register, the respective comparator 26 produces a pulse which is passed to a track-and-hold circuit for that column. Upon receiving such an enable pulse, an associated column driver stores a voltage equal to the instantaneous output of a ramp generator.

Upon completion of each ramp cycle, the voltages stored in the column driver circuits are supplied to a pixel in a particular row selected by the row drivers 18.

Each cell in an apparatus according to the invention could accordingly be controlled by such a prior-art arrangement for controlling and driving an electro-optic display device.

Figure 5:
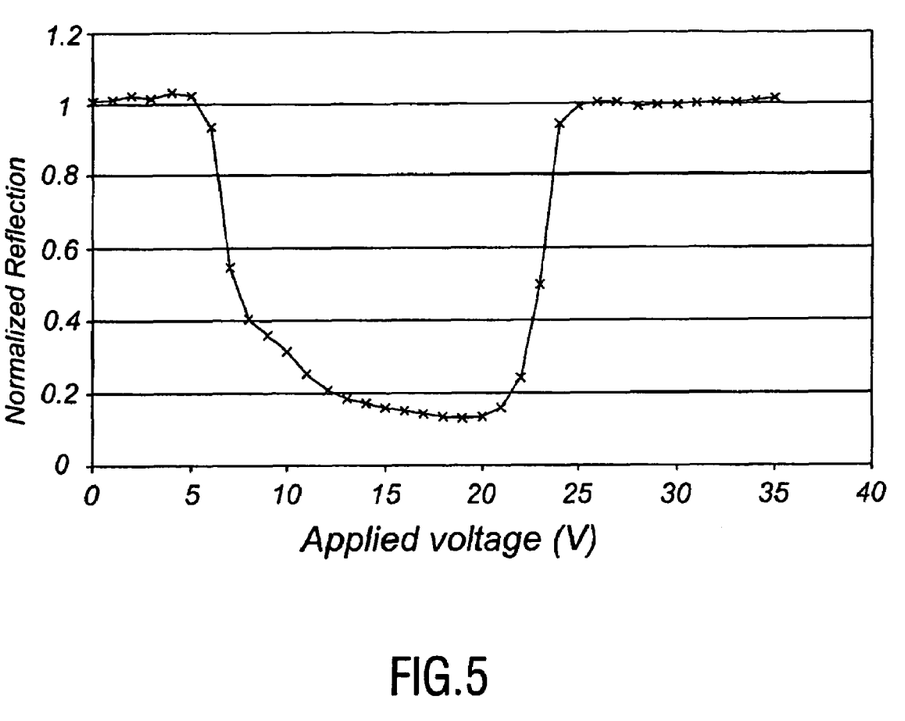
FIG. 5 is a graph illustrating the reflection vs. applied field strength of a liquid crystal mixture for a predefined wavelength.

FIG. 5 is a graph illustrating the reflection vs. applied field strength from a liquid crystal mixture for a predefined wavelength. Depending on the strength of the applied field, the molecules in LCD pixels can switch between light and dark states, or somewhere in between (gray scale). How the molecules respond to a voltage is the important characteristic of this type of display. The electro-distortional response determines the reflection of light through the cell.

Figure 6:
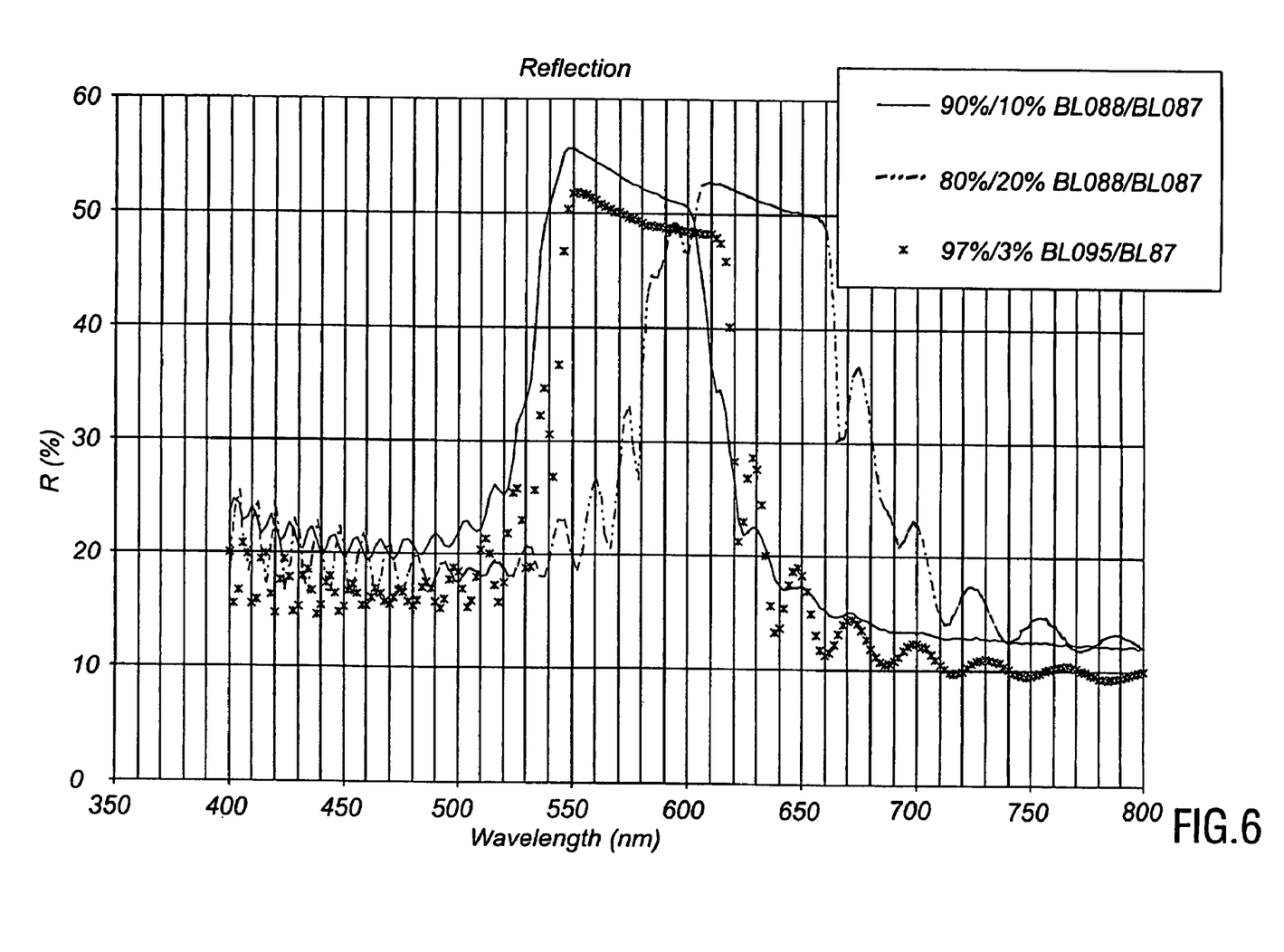
FIG. 6 is a graph of the reflection in percentage as a function of the wavelength for illustrating the wavelength dependency of reflection properties for three different liquid crystal mixtures.

FIG. 6 is a graph of the reflection in percentage as a function of the wavelength for illustrating the wavelength dependency of reflection properties for three different liquid crystal mixtures, namely: 90%/10% BL088/BL087, 80%/20% BL088/BL087 and 97%/3% BL095/BL087.

As will be appreciated by those skilled in the art, the demonstrated wavelength dependence of the reflected light for different mixtures can be exploited to construct full-color displays, such as RGB-displays, by creating a display, alternately filling the pixels with three different mixtures, each of which reflects essentially red, green and blue light, respectively.

Figure 7:
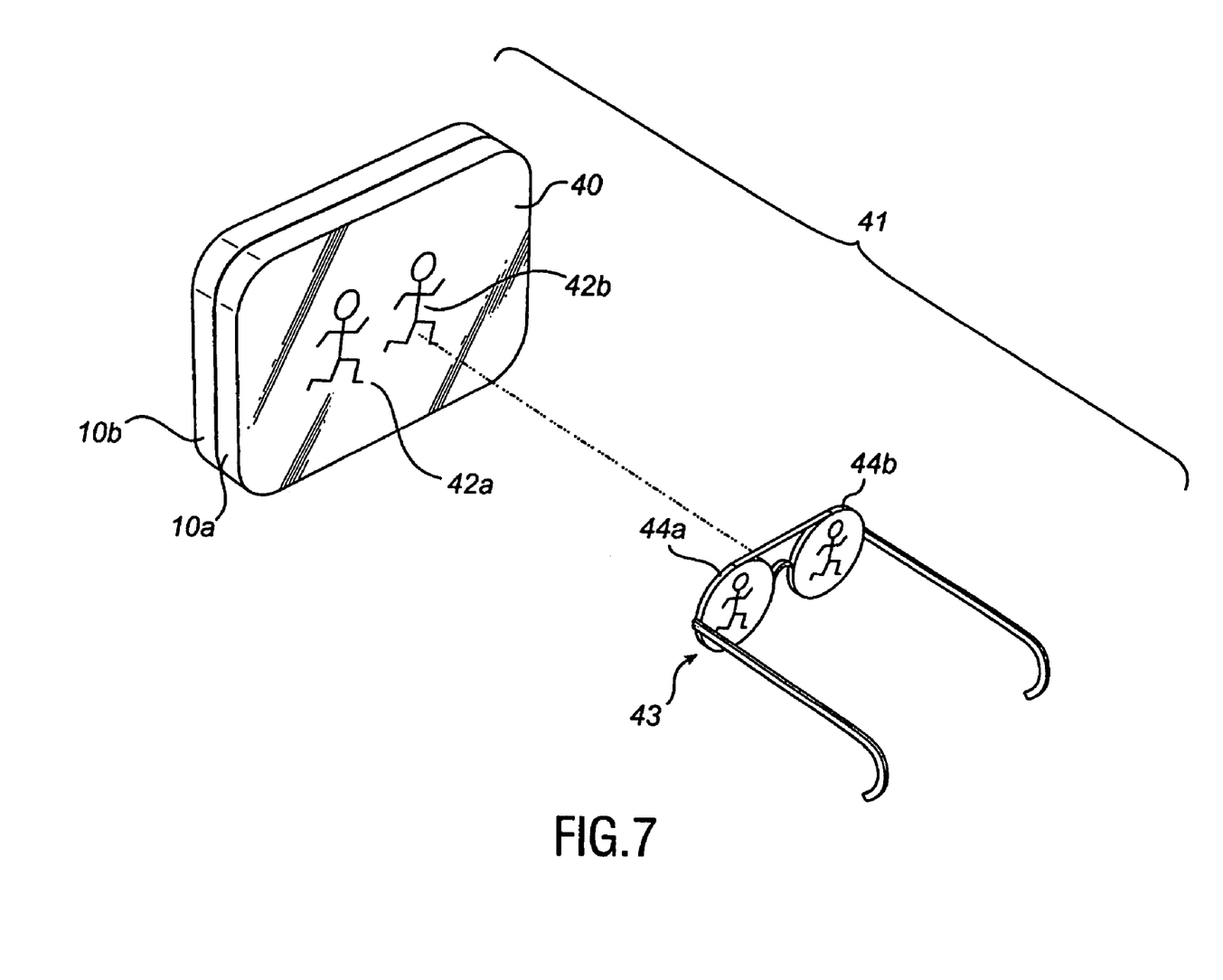
FIG. 7 illustrates a scenario wherein an observer experiences simulated stereoscopic vision.

FIG. 7 illustrates a scenario wherein an observer experiences simulated stereoscopic vision. A display 40 according to the invention is arranged at a distance 41 from an observer (not shown). The display 40 comprises two superimposed liquid crystal cells 10a and 10b as has been described previously with reference to FIGS. 1 to 3. Each of these cells is connected to the necessary electronics. The upper cell 10a presents an image 42a and the lower cell presents an image 42b as indicated in FIG. 7. To a naked eye, both images will appear on the display. The images 42a, 42b are, however, coded using polarization, because the two cells 10a, 10b are arranged to reflect circularly polarized light of opposite handedness.

The eyewear 43, which for the purpose of illustration is depicted as glasses, is worn by the observer. The left and the right eye of the observer are observing the screen 30 through polarizing means 44a and 44b, respectively, which act as filter elements and are each highly transmissive to circularly polarized light of one handedness, but not transmissive to circularly polarized light of the opposite handedness. Consequently, only the image 42a created by the upper cell 10a is viewed by the left eye of the observer through the filter element 44a, and only the image 42b created by the lower cell 10b is viewed by the right eye of the observer through the filter element 44b.

When the image 42a which is transmitted by the upper cell 10a is a perspective view, corresponding to a left-eye perspective, and the image 42b which is transmitted by the lower cell 10b is a perspective view, corresponding to a right-eye perspective, the result is thus two separate perspective views for the left and the right eye, respectively, and hence the user experiences stereoscopic vision.

It is evident that the two respective perspective views could be an identical image, which could be experienced by a user no matter whether he or she is wearing the eyewear which is compulsory in the stereoscopic feature.

The described stereoscopic feature of the invention necessitates eyewear comprising filter elements which may be implemented, for example, as glasses, the lenses of which comprise appropriate polarizing means. These can be made in several ways, for instance, by means of absorbing polarizing films for LCD, in combination with lambda/2 retardation films for LCD. The orientation of the ordinary and extraordinary axis relative to the absorption axis of the polarizing film determines which handedness is absorbed and which handedness is transmitted. These components can be bought at Nitto-Denko or Sumitomo Chemical. A film of CTLC can be made which reflects light of one circular polarization and transmits the other one. These films are, however, relatively expensive.

In the preferred embodiment, the eyewear is implemented as glasses, but it is also possible to implement the eyewear as contact lenses.

Figure 8:
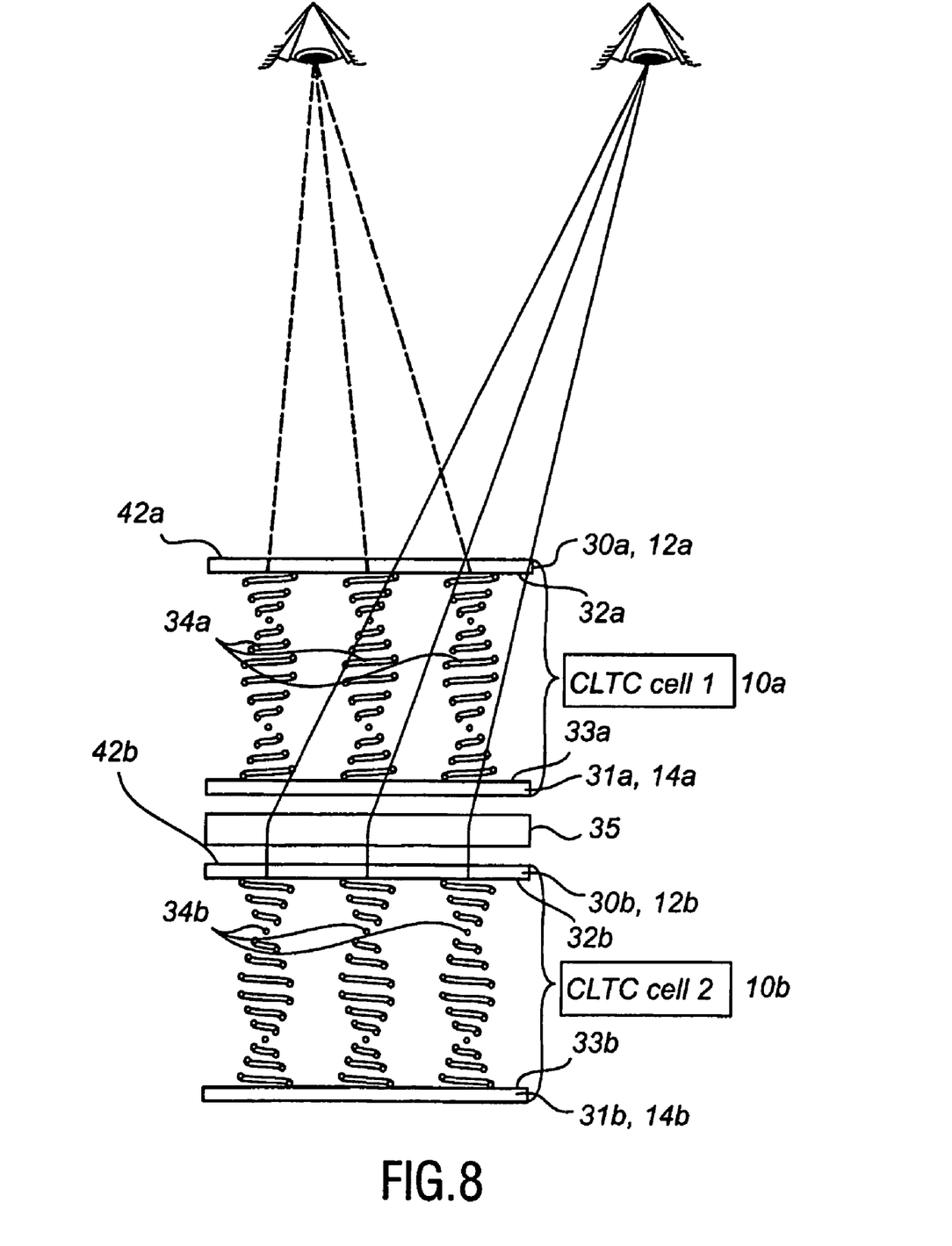
FIG. 8 illustrates another scenario wherein an observer experiences simulated stereoscopic vision.

FIG. 8 illustrates that the embodiments which have been (partially) illustrated in FIGS. 2 and 3 and previously described with reference to the aforementioned Figures do not require a user to use decoding eyewear to experience stereoscopic vision. This is because the cells 10a, 10b of the apparatus are arranged so that the images which are formed by the two cells propagate in slightly different directions as indicated in the Figure, resulting in their coincidence with the left and the right eye of a user at a certain distance.

The Figure illustrates a deviating optical element such as a lenticular sheet 35 arranged between the cells 10a, 10b to deviate the light which is reflected from the lower cell 10b in a direction slightly different from the direction in which the light from the upper cell 10a is reflected. It is nevertheless also perceivable to imagine a similar effect using the embodiment described with reference to FIG. 3, because this would imply that the two cells are observed from slightly different distances and thus from different angles. It is also perceivable that the deviation in the direction of propagation of one of the cells could be established by simply tilting one of the cells slightly as opposed to the previously described embodiments where cells are superimposed on each other, with their thin sheets of glass 30a, 31a, 30b, 31b essentially parallel to each other.

Although the preferred embodiment may be used in a portable device, it is also possible to imagine other scenarios wherein an apparatus according to the invention would prove to be useful.

Figure 9:
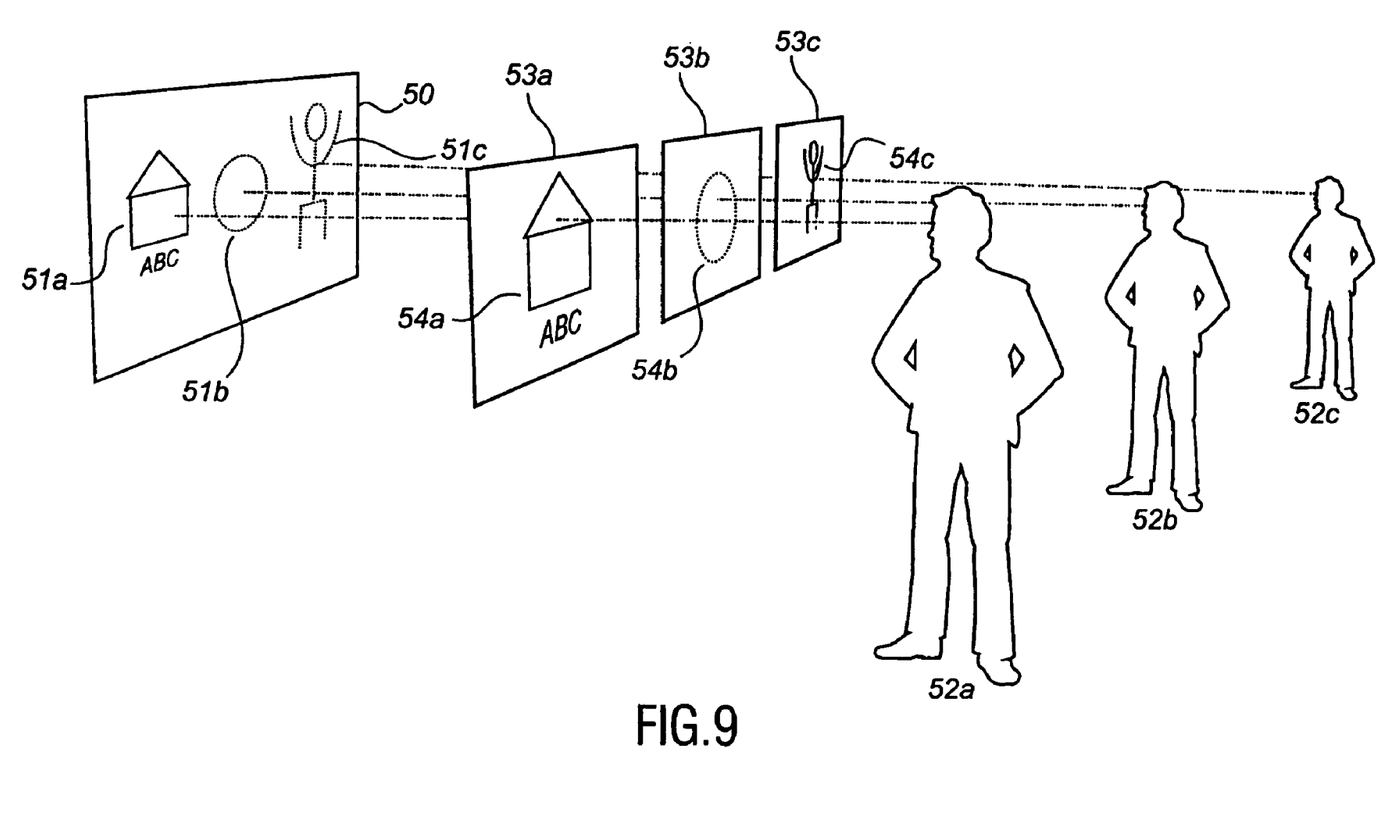
FIG. 9 illustrates yet another scenario wherein three observers receive three different images from the same screen.

FIG. 9 illustrates a user scenario wherein the apparatus according to the invention is used to provide several users with different images.

A large liquid crystal display 50 is arranged on a wall, for instance, in the passenger compartment of an aircraft, within view of three passengers 52a, 52b, 52c who are situated in different parts of the aircraft and face the liquid crystal display. The display comprises three different layers (not shown), each reflecting light having a certain wavelength and polarization properties. For the purpose of illustration, each of the three cells projects one of the images 51a, 51b and 51c.

Three decoding elements 53a, 53b, 53c are arranged in front of each observer, said decoding elements being arranged to essentially transmit only light from one of the cells to each observer. Consequently, the observer 52a only perceives the image 54a, the observer 52b only perceives the image 54b and the observer 52c only perceives the image 54c as indicated in the Figure.

For the purpose of simplification, the decoding elements are illustrated as screens, but it would also be possible to implement them as eyewear such as glasses which have been described previously.

A display according to the invention may additionally comprise a backlight unit, or it may be implemented as a portable or large-scale transmissive display.

When an apparatus according to the invention is used as a normal display, i.e. as a 2D-display, without glasses, each eye will receive the light reflected from both layers of the apparatus. This implies that, as a display device, the apparatus according to the invention has several advantages over the prior art. Only one cell could be used at a time, and the second cell could be used as a backup unit in case the first cell would fail.

As brightness is an important feature in liquid crystal display devices, it would be advantageous to use the display device according to the invention as a display device which provides a user with the option of selecting the degree of brightness. This could be practically realized by instructing the pixels in only one layer to reflect light when a low brightness is desired and instructing the pixels in both layers to reflect light when a higher brightness is desired. Since the layers reflect light which is circularly polarized with opposite handedness, there is no interference between the reflected light, thereby resulting in a sharp image.

This method of providing different levels of brightness could be extended to apparatuses comprising more than two superimposed cells. When a lower brightness is desired, a number N of cells (N being at least one but not equal to the total number of superimposed cells) could be manipulated into reflecting light, and when a higher brightness is desired, a number N+1 of superimposed cells could be manipulated into reflecting light.

The apparatus according to the present invention may be realized, for example, as a separate, stand-alone unit, or may alternatively be included in, or combined with, a mobile terminal for a telecommunication network, such as GSM, UMTS, GPS, GPRS or D-AMPS, or another portable device of an existing type, such as a Personal Digital Assistant (PDA), palmtop computer, portable computer, electronic calendar, electronic book, television set or video game control, as well as various other office automation equipment and audio/video machinery, etc.

The invention has mainly been described with reference to several embodiments. However, embodiments other than the ones disclosed above are equally possible within the scope of the invention, as defined by the appended patent claims. All terms used in the claims are to be interpreted according to their ordinary meaning in the technical field, unless explicitly defined otherwise. All references to "a/an/the [element, means, component, member, unit, step, etc.]" is to be interpreted openly as referring to at least one instance of said element, means, component, member, unit, step, etc. The steps of the methods described herein do not have to be performed in the exact order disclosed, unless explicitly specified.

The invention claimed is:

1. A reflective display apparatus comprising:
    a first liquid crystal cell, said first liquid crystal cell comprising a plurality of first full-color pixel elements configured to produce full-color images, said first pixel elements being controllable between a non-reflective state, in which electromagnetic radiation having a first polarization is reflected to a first extent, and a reflective state, in which said electromagnetic radiation having a first polarization is reflected to a second extent, said second extent being greater than said first extent, wherein the first liquid crystal cell is further configured to reflect electromagnetic radiation of the first polarization according to a first perspective view of a full-color image in a first direction; and
    a second liquid crystal cell, said second liquid crystal cell comprising a plurality of second full-color pixel elements configured to produce full-color images, said second pixel elements being controllable between a non-reflective state, in which electromagnetic radiation having a second polarization is reflected to a third extent, and a reflective state, in which said electromagnetic radiation having a second polarization is reflected to a fourth extent, said fourth extent being greater than said third extent, wherein the second liquid crystal cell is further configured to reflect electromagnetic radiation of the second polarization according to a second perspective view of the full-color image in a second direction, the first perspective view being separate from the second perspective view, and the first direction being different from the second direction, further characterized in that said first and second liquid crystal cells are configured so that said first polarization is different from said second polarization.

2. An apparatus according to claim 1, wherein the electromagnetic radiation has a wavelength of between 300 nm and 800 nm.

3. An apparatus according to claim 1, wherein said first polarization and said second polarization are circular polarizations of opposite handedness.

4. An apparatus according to claim 1, wherein said first and second liquid crystal cells are configured so that said first polarization is different from said second polarization via a polarization-altering element arranged between said first and second liquid crystal cells.

5. An apparatus according to claim 4, wherein said polarization-altering element is a halfwave plate.

6. An apparatus according to claim 1, further wherein said first and second liquid crystal cells are arranged to transit the first perspective view of the full-color image alone and the second perspective view of the full-color image alone to a first eye and a second eye, respectively, of an observer.

7. An apparatus according to claim 1, wherein at least one of said first and second cells is at least partially made of cholesteric texture liquid crystal (CTLC).

8. A portable device comprising a reflective display according to claim 1.

9. A portable device according to claim 8, wherein said device is one of a mobile telephone, a portable computer, an electronic calendar, an electronic book, a television set or a video game control.

10. A method of providing two separate perspective views of an image in a reflective display according to claim 1, wherein said method comprises the steps of:
    providing at least two separate filter elements, (i) a first of said two filter elements being capable of transmitting electromagnetic radiation having said first polarization and not transmitting electromagnetic radiation having said second polarization, and (ii) a second of said two filter elements being capable of transmitting electromagnetic radiation having said second polarization and not transmitting electromagnetic radiation having said first polarization,
    arranging the first filter element between the reflective display and an intended receiver of the first perspective view of the full-color image produced by the first full-color pixel elements of the first liquid crystal cell, wherein the intended receiver of the first perspective view perceives only the first perspective view of the full-color image, and
    arranging the second filter element, separately from the first filter element, between the reflective display and an intended receiver of the second perspective view of the full-color image produced by the second full-color pixel elements of the second liquid crystal cell, wherein the intended receiver of the second perspective view perceives only the second perspective view of the full-color image.

11. A method according to claim 10, wherein the first and second filter elements are arranged in front of the left and the right eye, respectively, of an observer.

12. A method according to claim 10, wherein said first and second perspective views create a 3D sensation when observed.

* * * * *